July 24, 1962 C. E. GREENE ETAL 3,046,056
SEAT BELT PROTECTOR BOOTS
Filed Feb. 20, 1961 2 Sheets-Sheet 1
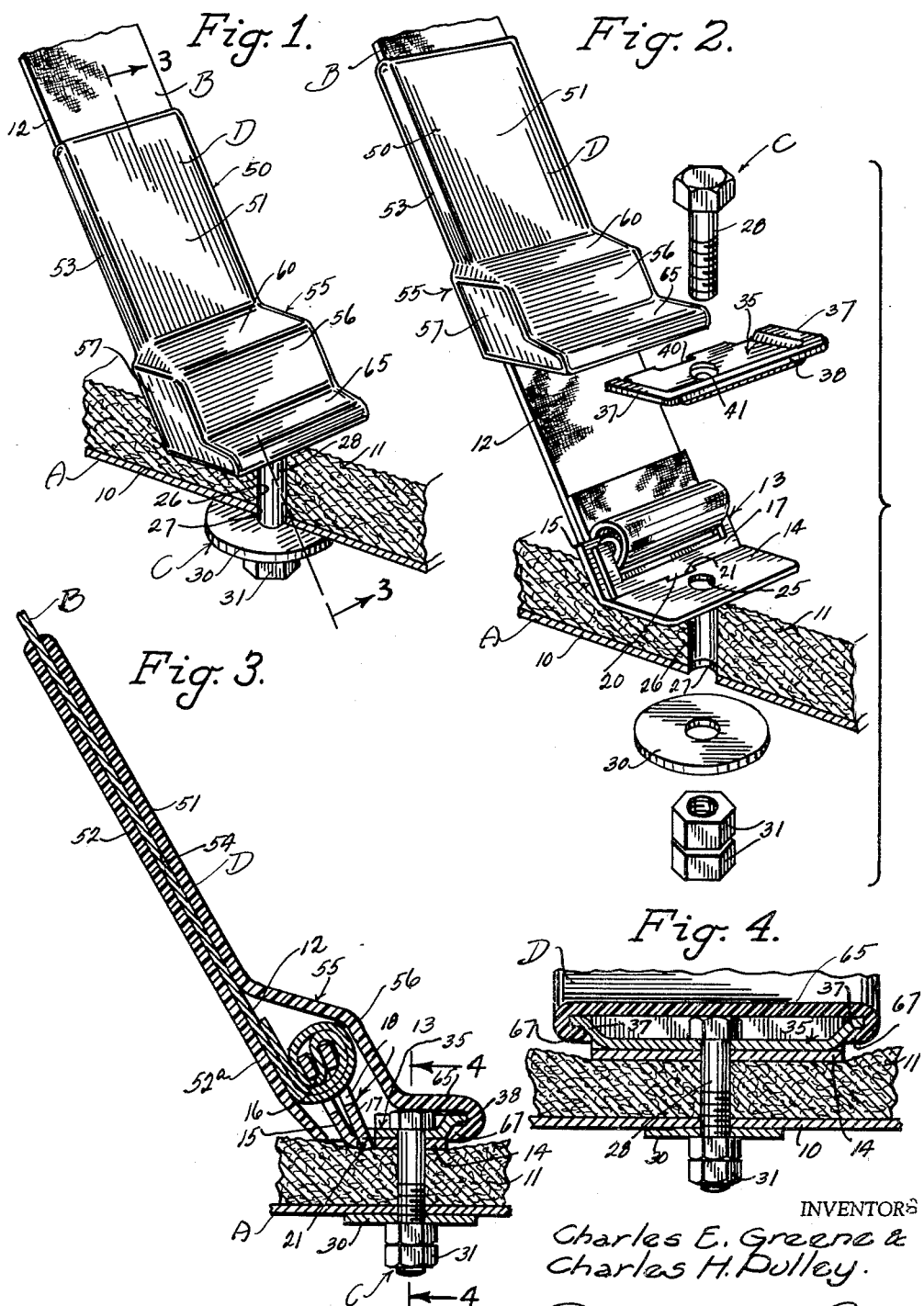
INVENTORS
Charles E. Greene &
Charles H. Dulley.
BY
ATTORNEYS

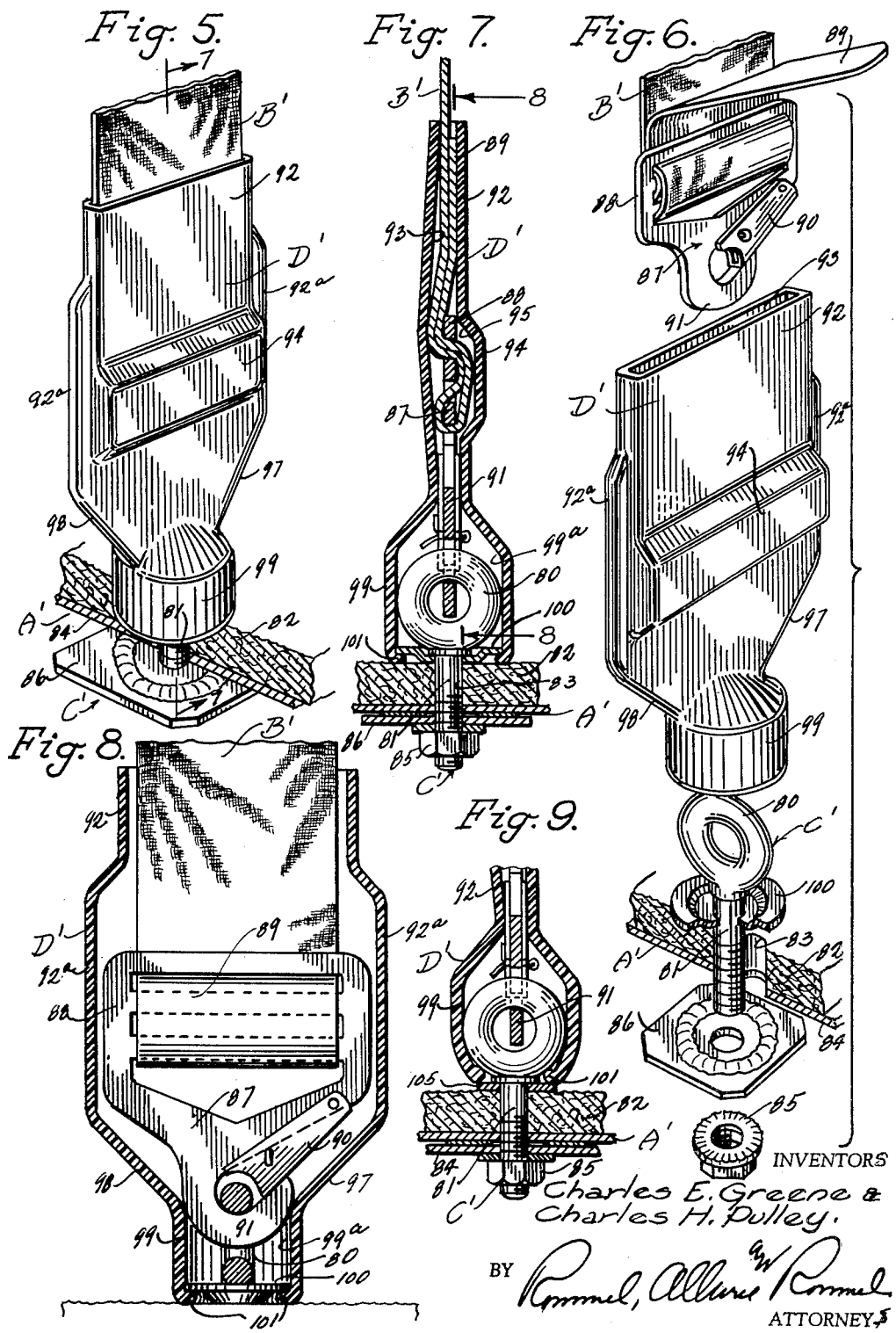

United States Patent Office 3,046,056
Patented July 24, 1962

3,046,056
SEAT BELT PROTECTOR BOOTS
Charles E. Greene, Milford, Mich., and Charles H. Pulley, Lexington, Ky., assignors to Irving Air Chute Company, Inc., Lexington, Ky., a corporation of Kentucky
Filed Feb. 20, 1961, Ser. No. 90,345
6 Claims. (Cl. 297—385)

This invention relates to improvements in safety belt guard boots.

The primary object of this invention is the provision of a resilient and flexible guard boot or container adapted to be used at the bolting connections of safety straps to car frames for protecting the safety webbing and keeping it in place; improving the appearance thereof, and to serve as a guard against accidental injury to persons and articles.

It is a further object of this invention to provide a safety belt guard member of rubber like material preferably formed of plastic vinyl compound, which is elastic and flexible, and which is in the shape of a tubular container adapted to receive portions of the safety belt or webbing and its bolting mechanism; which is readily detachable and serves to shield and contain the bolting attachments of the belt and to hold the webbing in its adapters against liability of accidental loosening and release.

Other objects and advantages of this invention will be apparent during the course of the following detailed description.

In the drawings, wherein for the purpose of illustration are shown preferred and modifier forms of the invention:

FIGURE 1 is a fragmentary perspective view, partly in section, showing the boot in encased relation upon the safety belt at the bolting assemblage.

FIGURE 2 is a view showing the bolting assemblage in exploded or developed view in relation to the boot.

FIGURE 3 is a cross sectional view taken substantially on the line 3—3 of FIGURE 1.

FIGURE 4 is a cross sectional view taken substantially on the line 4—4 of FIGURE 3.

FIGURE 5 is a perspective view, partly in section, showing a modified form of boot attached upon the bolting assemblage end of belting.

FIGURE 6 is an exploded or developed view of the details shown in FIGURE 5.

FIGURE 7 is a cross sectional view taken substantially on the line 7—7 of FIGURE 5.

FIGURE 8 is a cross sectional view taken substantially on the line 8—8 of FIGURE 7.

FIGURE 9 is a view showing how the boot of FIGURE 5 may be attached and held in position upon the bolting assemblage in a manner different than that shown in FIGURE 7.

In the accompanying drawings forming a part of this specification, and wherein similar reference characters designate corresponding parts throughout the several views, the letter A may generally designate a frame, such as an automobile frame or aircraft frame, to which is attached a safety belt structure B by bolt mechanism C. The safety belt B at its connection with the bolting mechanism C to the car frame underbody is adapted to be releasably received within a tubular shaped resilient and flexible plastic boot structure D under such circumstances as to form a guard for the webbing of the belt and the bolting mechanism. A second form of invention may include the use of a boot D' somewhat differently shaped than boot D but adapted to be attached to the bolting mechanism C' which connects the webbing of belt B' to a car frame A'.

Referring to the form of invention shown in FIGURES 1 to 4 inclusive, the car frame A may include an underbody or platform 10 upon which may be placed a carpet, padding or rug 11. It is known to provide flexible webbing 12 for safety belts, ends of which are secured to the vehicle frame by bolting means. In the form of invention shown in FIGURES 1 to 4 inclusive, an L-shaped metal bracket 13 is provided having a flat like portion 14 adapted to be placed on top of the carpet 11 and an acute angled webbing attaching portion 15 provided with a slot 16 therein through which the webbing 12 is threaded. This bracket structure 13 includes a clamping plate 17 provided with a slot 18 also adapted to receive the webbing 12. The mode of assemblage is shown in FIGURE 3; the plate 17 being provided with an extension lug 20 adapted to seat in an opening 21. The strap end 12 is doubled upon itself and threaded as shown in FIGURE 3 through the slots 16 and 18, under such circumstances that a tug upon the webbing 12 will insure that its connection upon the bracket 13 and plate 17 will not be pulled out of position. No part of the present invention relates to this mode of securing a belt or webbing to such an adapter. In normal position the bracket 13 is placed so the opening 25 in the portion 14 thereof lies in alignment with an opening 26 through the carpet 11 and a complementary opening 27 in the platform 10. A bolt 28 is adapted to be extended through the openings 25, 26 and 27 and the threaded end extended beneath the platform or underbody 10 and there having loosely placed thereon a sealing washer 30; the threads of the bolt receiving the nut assemblage 31. Normally the head of the bolt 28 will be clamped directly on the bracket leg 14. The invention comprehends the provision of a boot retainer 35, of rigid metal, having a rectangular shaped body portion 36 which is flanged upwardly and outwardly at its ends 37 and similarly flanged upwardly and outwardly at one longitudinal margin thereof at 38. The other longitudinal margin is notched at 40 to receive the lug 20 of plate 17. An opening 41 is located in the body portion of the boot retainer 35 and receives the shank of the bolt 28 therethrough.

The boot D as shown in the drawings is of tubular formation, including an elongated belt receiving flat section 50 adapted to snugly but slidably receive the webbing 12 in threaded relation therethrough. This portion 50 includes front and rear walls 51 and 52 and side walls 53 defining a passageway 54 therein for the webbing. A lower enlarged skirt portion 55 of the boot D comprises a rear wall portion 52ª in the same general plane of the wall 52, an outer wall 56 which projects forwardly of the plane of the front wall 54 and side walls 57 which are wider than the walls 53. This portion 55 has a downwardly sloping shoulder 60 at the top front and sides. At its lower end the wall 56 is horizontally flanged at 65. The portion 65 and the lower margins of the side walls 57 are provided with inturned retaining flanges 67 shown best in FIGURES 3 and 4 of the drawings adapted to be releasably snapped over and under the flanges 37 and 38 of the boot retainer 35 (see FIGURES 3 and 4).

After the webbing 12 of the safety belt B has been bolted by the assemblage C upon the car frame A the guard boot D is slipped downwardly from the up position shown in FIGURE 2 until the upstanding portions of the bracket and the lower end of the webbing are received within the compartment of the enlarged portion 55 of the boot, as shown in FIGURE 3. The retaining flanges 67 of the boot are then snapped over and underneath the rigid retaining flanges 37 and 38. The boot is now in the position shown in FIGURE 1 and acts as a guard not only to prevent scuffing and injury to articles placed thereon, but the boot being flexible and resilient is contracted sufficiently over and upon the secured lower end of the webbing 12 at the bolt assemblage, so as to prevent any liability of loosening of the doubled end of the belt where it is secured upon the bracket structure 13. Of course the boot cannot slip upwardly along the belt, due to its releasable connection with the boot retainer 35, serves as a protection against injury to persons and prevents accidental release of the belt B from its connection with the bracket 13 and plate 17.

Referring to the modified form of boot D' shown in FIGURES 5 to 9 of the drawings, the bolting arrangement C' consists of an eye bolt 80 having a screw threaded shank 81 adapted to be extended through an opening 83 in the carpet 82 and through an opening in the underbody 84 of the frame A'. At its lower end it receives a nut 85 which is secured against a washer type sealer 86 in well known manner. In this form of invention the circular eye or head of the bolt 80 extends upwardly from the floor and there the same detachably receives the hook assemblage 87 of a coupling connection 88 provided with slots to receive the double threaded end 89 of the belt B', as shown in the drawings. The hook assemblage 87 includes a latch fastener 90 of well known construction normally spring biased into retaining position so that the same may be depressed to release the coupling from its connection with the eye 80.

The boot D' is of flexible and resilient plastic, molded to form, including a tubular webbing receiving upper portion 92 providing a passageway 93 therein through which the belt $B^1$ is snugly but slidably threaded. An outer wall of the portion 92 is laterally enlarged at 94 to provide a pocket 95, as shown in FIGURE 7, to receive the bulge of the doubled strap portion 89 incident to connection of the belt B upon the connector piece 87. The boot D' at its lower skirt portion is sloped inwardly and convergently downward at 97 and 98; terminating in a cylindrical shaped portion 99 which at its lower end is inwardly flanged at 101, as shown in FIGURES 7, 8 and 9 of the drawings. The portion 99 defines a socket $99^a$ adapted to receive the eye 80 of the bolt. One mode of attaching the boot D' upon the coupling assemblage is to provide a flanged boot retainer 100, in the form of a washer, which is provided with upwardly and outwardly flanged portions adapted to be received within the opened end of the cylindrical portion 99. Under these circumstances the flange 101 would engage beneath the top flanges of the washer 100. As an alternative, a washer 105 may be used under the bolt head and the lower end of the cylinder 99 expanded and then contracted beneath the downwardly convergent sides of the eye 80 of the bolt, as shown in FIGURE 9. The boot also protects the latch 90 against accidental release from the eye 80 within the lower portion 99 of the boot.

Various changes in the size, shape and arrangement of parts may be made to the form of invention herein shown and described, without departing from the spirit of the invention or scope of the claims.

We claim:

1. In a safety belt and guard boot assemblage the combination of a frame, a flexible belt, a bolt assemblage detachably connected to the frame, means connecting the belting to said bolting assemblage, and a flexible guard boot slidably mounted upon the belt and having a portion thereof covering the last mentioned means and the bolting assemblage at the upper portion of the latter and there being retained in position by a releasable connection to said bolting assemblage.

2. In combination with a safety belt having a hook type connector assemblage thereon, a frame, a bolting assemblage connected to the frame having an upwardly extending eye for releasable connection to said hook connector, a guard boot of resilient flexible material slidably mounted upon said belt and covering the end thereof and the connector when the connector is attached to said eye, and means to releasably hold the lower end of the boot over the connector assemblage and eye of the bolting assemblage.

3. As an article of manufacture a flexible guard boot for vehicle safety belts comprising an elongated flattened upper portion laterally enclosed and providing a passageway therethrough of rectangular cross section open at the top of said portion, the bottom of said portion being outwardly laterally enlarged to provide an enlarged chamber therein and at the extreme bottom thereof having a further lateral outward extension and an opening therein at the bottom, said bottom at its extreme lower margin about said opening being provided with an inturned retaining flange.

4. As an article of manufacture a flexible rubber like boot for vehicle safety belts comprising an upper elongated flattened portion having a passageway therethrough adapted to receive conventional safety belt webbing in rather snug slidable fitting relation therewith, the lower end of the boot having a laterally enlarged flexible skirt portion having a passageway therethrough aligning and in communication with the passageway of the upper portion, said skirt portion at the lower end thereof being opened to receive a safety belt vehicle connector.

5. The safety belt as described in claim 4 in which the lower skirt portion of the boot has the side edges thereof converging downwardly towards the lower opening therein, and in which the skirt is provided between said convergent edges with a lateral passageway enlarging extension.

6. In a safety belt assemblage the combination of a flat web safety belt, a flat connector attached to an end of the safety belt including a hook, a car frame attaching bolt assemblage having an upwardly extending eye to releasably receive the hook therein, a latch pivotally associated with the connector for normally releasably closing the entrance to the hook for holding the hook in the eye of the bolt assemblage, and a flexible rubber-like boot comprising an upper elongated flat portion with a passageway therethrough receiving the safety belt webbing in rather snug sliding relation therewith, the lower end of the boot having a laterally enlarged flexible skirt portion with a passageway within which the hook, latch and eye of the bolt are releasably received and enclosed thereby.

References Cited in the file of this patent

UNITED STATES PATENTS

| | | |
|---|---|---|
| 1,848,313 | Buresh | Mar. 8, 1932 |
| 2,488,858 | Franz | Nov. 22, 1949 |
| 2,627,420 | Wheeler | Feb. 3, 1953 |
| 2,904,769 | Sampson | Sept. 15, 1959 |
| 2,945,275 | Almeter | July 19, 1960 |